United States Patent [19]

Degi et al.

[11] Patent Number: 5,561,725

[45] Date of Patent: Oct. 1, 1996

[54] IMAGE PROCESSING METHOD AND APPARATUS

[75] Inventors: Greg A. Degi, Fort Collins; Edward S. Beeman, Windsor; David W. Boyd, Greeley, all of Colo.

[73] Assignee: Hewlett-Packard Company, Palo Alto, Calif.

[21] Appl. No.: 239,016

[22] Filed: May 6, 1994

[51] Int. Cl.⁶ ............................................ G06K 9/42
[52] U.S. Cl. ...................................... 382/299; 382/298
[58] Field of Search .................................... 382/299, 298, 382/293, 300; 358/451; 395/139

[56] References Cited

U.S. PATENT DOCUMENTS

| | | | |
|---|---|---|---|
| 5,113,455 | 5/1992 | Scott | 382/298 |
| 5,161,035 | 11/1992 | Muramatsu | 382/299 |
| 5,185,817 | 2/1993 | Degi et al. | 382/47 |
| 5,265,176 | 11/1993 | Miller | 382/299 |
| 5,335,295 | 8/1994 | Ferracini et al. | 382/298 |

*Primary Examiner*—Yon J. Couso

[57] ABSTRACT

An image processing method for converting an input matrix into an output matrix including steps of calculating an increment value and a target value based upon the resolution of the input matrix and the resolution of the output matrix. As each picture element of the input matrix is received the increment value is added to the value of a counter. When the value of the counter is greater than the target value, the received picture element is placed into the output matrix and the target value is subtracted from the value of the counter.

24 Claims, 6 Drawing Sheets

IMAGE PROCESSING METHOD AND APPARATUS

BACKGROUND OF THE INVENTION

1. Field of the Invention.

The present invention relates, in general, to an apparatus and method for image processing and, more particularly, to an image processing apparatus and method for converting an input matrix having a first number of picture elements per unit length into an output matrix having a second number of picture elements per unit length.

2. Statement of the Problem

A scanning device is used to digitize an image and provide that digitized image as an input to a computer. The scanning device generates an n-dimensional digital representation from an n-dimensional image. Ordinarily, the image is two-dimensional. The digital representation comprises an n-dimensional matrix of picture elements, commonly called pixels. For each pixel, one or more values are generated indicating the amount of light reflected from or absorbed by a portion of the image that the pixel represents. Each pixel may also contain information as to the color of that portion of the image, or any other convenient variable that describes the portion of the image that the pixel represents.

Resolution is the number of pixels used to represent an image. The resolution of a matrix of pixels is the number of pixels in the matrix. Resolution is alternatively expressed in terms of pixels per unit length, pixels per unit area, pixels per image, or some other multi-dimensional unit that is convenient. For convenience and simplicity, resolution is stated herein as picture elements per unit length. This corresponds to one-dimensional input and output matrices, such as a one-dimensional data stream. It must be understood, however, that the teachings of the present invention are easily adapted to multi-dimensional input and output matrices.

Each device that processes the digitized image, including computers, facsimile machines, plotters, printers, and the scanning device itself have different resolutions at which they are able to process the image. Accordingly, the resolution of the input matrix often exceeds the resolution of other devices that will process it. Such devices require that an image processing circuit first reduce the resolution.

An image processing circuit for reducing the resolution places samples of the input matrix into an output matrix. Because the output matrix contains only the samples of the input matrix, the output matrix is a digital representation of the input image, but has a lower resolution, (i.e., fewer pixels per image) than does the input matrix.

A prior image processing method uses a process called binary rate multiplication on the input matrix to generate the lower resolution output rows of the output matrix. Binary rate multiplication is a process of partitioning a set of elements into a number of mutually exclusive subsets. Each subset has a different number of picture elements. The lower resolution output matrix consists of a combination of these subsets in which the total number of pixels equals the desired resolution. The desired resolution, as used hereinafter, is the number of pixels per unit length that is required by the device using the digitized image.

Specifically, the first subset in the binary rate multiplication process consists of every second element of the input matrix. The second subset consists of every fourth element of the input matrix. The first element of each subset is the first element of the set that is not yet selected in a larger subset. In general, the $i^{th}$ subset consists of every $(2^i)$th element of the set.

One disadvantage of binary rate multiplication is that when used to eliminate more than a small percentage of pixels in the input matrix, the output matrix will substantially distort the input image. This is the case whenever the resolution of the device using the digitized image is much lower than the resolution of the scanner or the desired output matrix is not exactly one of the subsets. Another disadvantage of binary rate multiplication is that the pixels that are selected from the input matrix were unevenly spaced when placed in the output matrix. This uneven spacing is much worse than is necessary from the granularity of the incoming data. It is advantageous to have a scanning method and apparatus that picks the closest of the incoming pixels to the desired sample point and places these picked pixels into the output matrix.

Another prior method of image processing uses pixel replication and two-dimensional convolution to generate an intermediate matrix having a resolution that is an integer multiple of the resolution of both the input matrix and the output matrix. It then generates the output matrix by selecting from the intermediate matrix a subset of pixels that are evenly spaced from one another. The number of pixels between each pixel of the subset is one less than the ratio of the resolution of the intermediate matrix to the resolution of the output matrix.

This method is described in U.S. Pat. No. 5,185,817, issued to Degi et al. on Feb. 9, 1993. This method produces more accurate output matrices than the binary rate multiplication, however, two-dimensional convolution requires extensive computation time. Therefore, two-dimensional convolution cannot process images in real time without expensive high-speed computing equipment and is not suitable for many applications.

The Degi et al. patent also describes an improved image processor that converts an input matrix into an output matrix using an intermediate resolution matrix. The number of pixels in a particular dimension of the intermediate resolution matrix is an integer multiple of the desired number of output pixels in the same dimension. This method enables the image processor to select output pixels from the intermediate resolution matrix that are evenly spaced from one another in the same dimension.

This method reduced the uneven spacing problem of the prior methods but still falls short of selecting the closest of the input matrix picture elements to the desired sample points. A need remains for an image processing method and apparatus that simply and quickly converts an input matrix having a first number of picture elements into an output matrix having a second number of picture elements.

3. Solution to the Problem

The present invention solves the above identified problems by method and apparatus that serially receives picture elements from an input matrix and increments a counter each time a picture element is received. An increment value is calculated based on the resolution of the input matrix and the resolution of the output matrix. A target value is also calculated. The value of the counter is compared to the target value to indicate when an incoming pixel from the input matrix should be passed to the output matrix. In this manner, the pixels of the input matrix that are closest to the desired sample points are chosen and placed in the output matrix.

SUMMARY OF THE INVENTION

The present invention involves an image processing apparatus and method for converting an input matrix of picture elements into an output matrix of picture elements. A first number of picture elements per unit length for the input matrix is determined to represent the resolution of the input image. A second number of picture elements per unit length for the output matrix representing a desired resolution of the output image is also determined.

An increment value is calculated that is preferably the second number of picture elements divided by the first number of picture elements. A target value is also calculated that is, for example, the integer 1. In a preferred embodiment, the increment value and target values are scaled by a scaling factor to reduce calculations and hardware required to implement the method.

Each picture element of the input matrix is sequentially received. For each received picture element, the increment value is added to the value of a counter. When the value of the counter is substantially equal to and preferably equal to or greater than the scaled target value, the incoming picture element from the input matrix is placed into the output matrix. The target value is subtracted from the value of the counter and the process continues by sequentially receiving picture elements of the input matrix until the entire input matrix has been processed.

The image processing system and apparatus of the present invention involves a first register for holding the first number of picture elements per unit length in the input matrix, and a second register for holding the second number of picture elements per unit length in the output matrix. A third register serves as an accumulator or counter. An adder, for example, a binary adder, is coupled so as to add the increment value to the counter each time a picture element is received from the input matrix. The counter is coupled to a comparator that compares the value of the counter to the value in the second register and produces a control signal when the value in the counter exceeds the value in the second register. The control signal enables the system to pass the incoming picture elements to the output matrix and causes the adder to subtract the target value from the value in the counter.

DETAILED DESCRIPTION OF THE DRAWING

1. Overview

Figure 1:
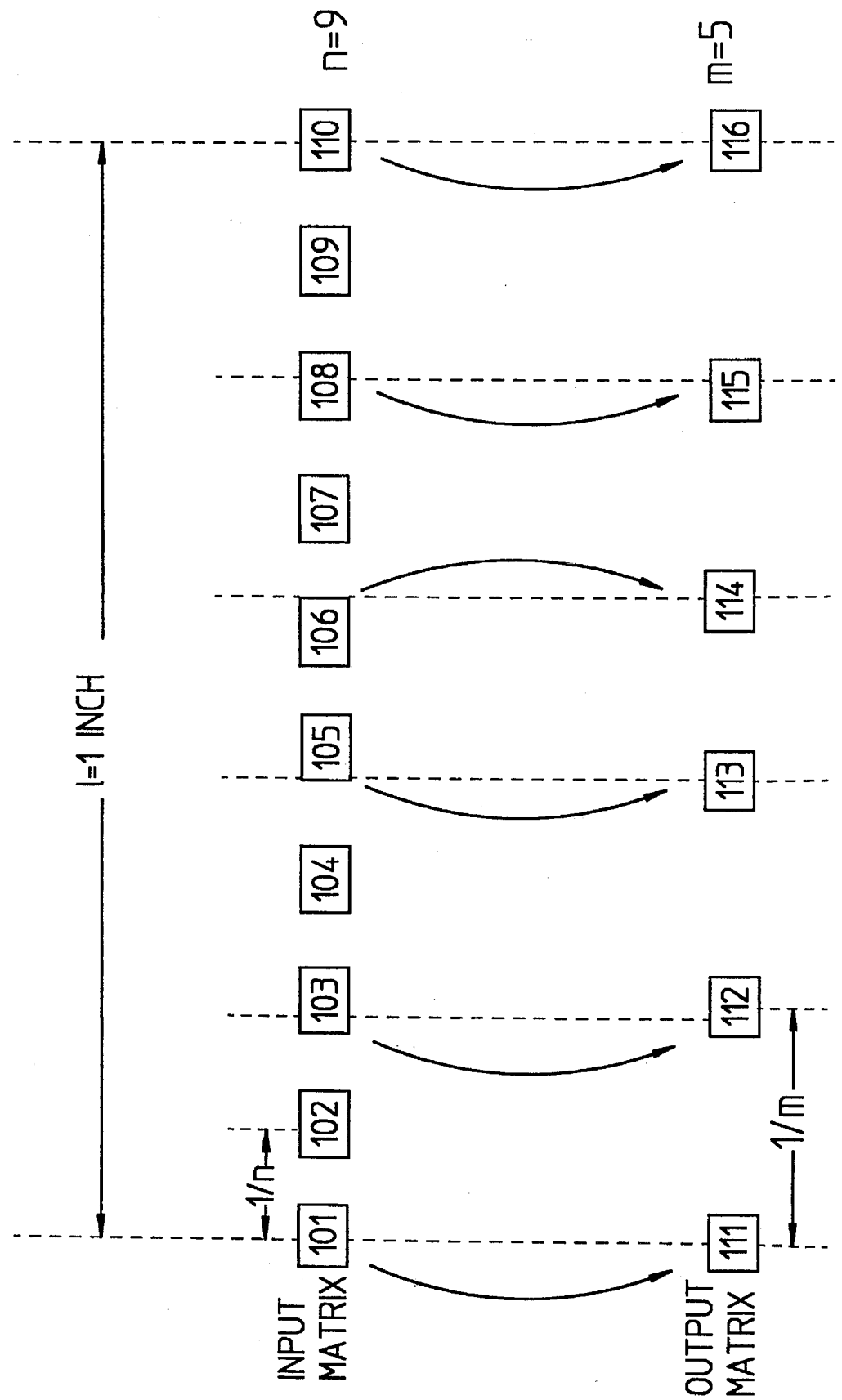
FIG. 1 illustrates a set of picture elements in an input matrix and an output matrix visually illustrating the pixel selection process in accordance with the present invention.

FIG. 1 illustrates pictorially the general purpose and overall functioning of the apparatus and method in accordance with the present invention. FIG. 1 shows an input matrix comprising ten picture elements numbered 101 through 110. Also shown in FIG. 1 is an output matrix comprising six picture elements numbered 111 through 116. Although the picture elements are illustrated as rectangles in FIG. 1, it should be understood the actual picture element may be any shape and size that is convenient for a particular application, or may represent bits of data that have no shape.

The number n=9 shown adjacent to the input matrix in FIG. 1 indicates that in the unit length l there are nine picture elements and thus represents the resolution of the input matrix. Likewise, the number m=5 in FIG. 1 indicates that the resolution of the output matrix is five picture elements per unit length l. It should be understood that the resolution numbers n and m are for example only and can in practice be any numbers, including fractional values. Likewise, the unit length l can be any convenient length. As will be seen, it is useful to choose the unit length l such that n and m are integers to ease the mathematics and hardware necessary to implement the present invention.

To ease understanding of the present invention, it is assumed hereinafter that unit length l is the integer one, and may be, for example, one inch, one centimeter, one millimeter or any other unit of measure. This assumption is accurate because the unit length l is arbitrarily chosen for the convenience of the user.

In order to reduce the input matrix resolution to provide the output matrix, some of the picture elements 101–110 in the input matrix must be selected and placed in the output matrix. Sub-sampling methods involve choosing which of picture elements 101–110 are selected to be members of the output matrix. To minimize distortion in the output matrix, it is desirable that the selected picture elements be as evenly spaced as possible in the input matrix. For example, if the picture elements 101–106 were selected and placed in output matrix picture elements 111–116, a high degree of distortion would result because all of the information in picture elements 107–110 would be lost.

The dashed lines in FIG. 1 indicate the centers of pixels 111–116 in the output matrix. These dashed lines are not a part of the present invention but are only used for reference to visually compare the input matrix and output matrix. An overall goal in accordance with the present invention is to select picture elements from the input matrix that come closest to one of the dashed lines shown in FIG. 1. In other words, the pixels that are selected to be transferred to the output matrix must best represent or replicate the input matrix.

As shown in FIG. 1, output matrix pixel 111 directly aligns with input matrix pixel 101 and should be selected as indicated by the arched arrow in FIG. 1. The dashed line extending from output picture element 112, however, is closest to input picture element 103. This means that output picture element 112 should be filled by input picture element 103 and that input picture element 102 will be skipped in accordance with the method and apparatus of the present invention. Likewise, picture element 105 is passed onto output matrix picture element 113, picture element 106 fills picture element 114, picture element 108 fills picture element 115, and picture element 110 fills picture element 116.

For purposes of discussion, the distance between two picture elements in the input matrix is 1/n. This is illustrated in FIG. 1 as the distance between picture elements 102 and 101. The distance between picture elements in the output matrix is 1/m as shown by the distance indicated between picture elements 111 and 112. These distances assume that the length l=1 which is an accurate assumption as set out hereinbefore.

The method in accordance with the present invention can be executed in several ways, each of which is described in detail below. Section 2 describes what is referred to as a "fractional method" because it involves fractional calculations and numeric manipulations. Section 3 describes an embodiment of the method of the present invention in which all the calculations are scaled by a scaling factor that results in integer calculations that can be made accurately and easily in digital computers. Section 4 describes another embodiment of the present invention that involves scaling by a power of 2 which is believed to be the best mode of practicing present invention. Section 5 describes hardware implementations of each of the methods in accordance with the present invention.

Although FIG. 1 illustrates the input matrix and output matrix as one-dimensional data streams, it should be understood that the method and apparatus in accordance with the present invention are applicable to two-dimensional and three-dimensional matrices. Higher-order matrices may also be used where additional data, for example color data, is treated as a separate dimension. Likewise, the input matrix may be one-dimensional where the device using the output matrix converts the output matrix into a multi-dimensional image. Also, while the method steps described hereinafter are best performed in the order presented, unless specifically directed, the steps of each of the methods in accordance with the present invention may be performed in any order to fit the particular needs of an application. Likewise, the method in accordance with the present invention can be suspended with the execution of sub-routines, gathering data, or the like and execution restarted at a later time.

2. Fractional Method

Using the model shown in FIG. 1, an input matrix has a resolution of n picture elements per unit length. In the specific example of FIG. 1, n=9. This means that each pixel is 1/n away from its neighbor. If the desired output matrix has a resolution of m picture elements per unit length, the sub-sampling method used should optimally place each pixel on a grid spaced 1/m between neighbors.

Assuming that the first picture element 101 of the input matrix is passed to first picture element 111 of the output matrix, then the next pixel that should be passed from the input matrix to the output matrix will be the pixel closest to 1/m away. Each incoming pixel covers only a portion of this distance 1/m. The fractional distance covered by each incoming pixel is expressed as $$\frac{1/n}{1/m}.$$

In the specific example of FIG. 1, this is $$\frac{1/9}{1/5}$$

or 0.56. This means that each incoming pixel spans 0.56 of the distance between pixels in the desired output matrix.

An important feature of each embodiment of the method in accordance with the present invention is that a counter is incremented by a calculated increment value each time an incoming picture element of the input matrix is received. In the first embodiment, this increment value is $$\frac{1/n}{1/m}$$

which represents the fractional portion that each incoming pixel covers. Optionally, the counter is initialized to a value of approximately half this increment, or $$\frac{1/n}{2/m}.$$

The present invention focuses on determining optimum pixel spacing, and not identification of particular pixels that must be transferred to the output image. Accordingly, this initialization step is optional as it does not change the pixel spacing and the method in accordance with the present invention works well without initialization.

Figure 2:
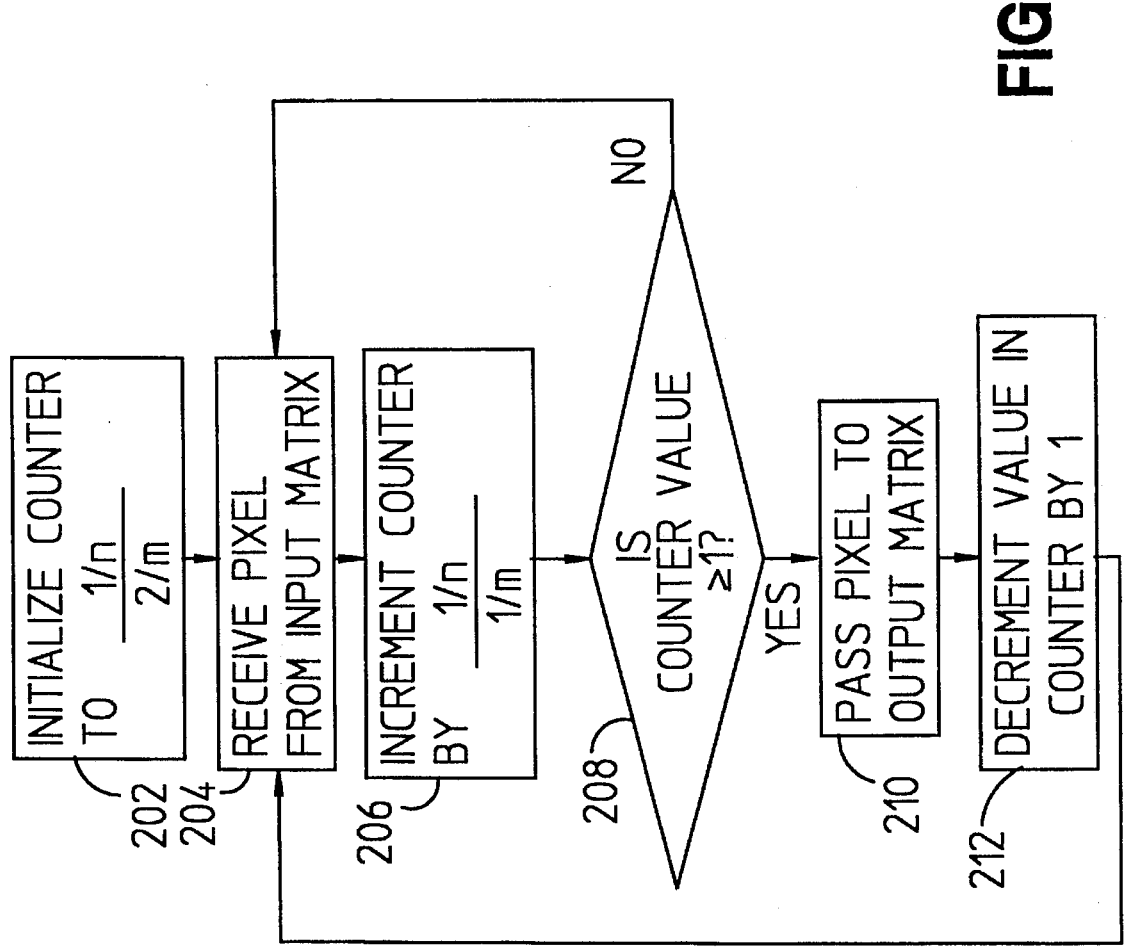
FIG. 2 shows a flow chart of a first embodiment method in accordance with the present invention.

FIG. 2 illustrates a flow chart showing the steps carried out in the first embodiment. As set out hereinbefore, the counter is initialized to a value of $$\frac{1/n}{2/m}$$

in step 202. A pixel is received from the input matrix in step 204 and the counter is incremented by the increment value in step 206. In step 206, the increment value is $$\frac{1/n}{1/m}$$

in the first embodiment shown in FIG. 2.

After the counter is incremented, the counter value is tested in step 208 to see if it is greater than the target value. In the first embodiment, the target value is one. As shown in FIG. 1, the target value being set to one represents that the counter value is greater than the distance between picture elements in the output matrix. If the counter value is less than one in step 208, the process returns to step 204 and receives the next picture element in the input matrix. In this case, the first picture element received is not passed to the output matrix.

If the counter value is greater than one in step 208, flow passes to step 210 in which the picture element in the input matrix is passed to the output matrix. Next, the counter value is decremented by the target value in step 212, which in this case is one. The counter can be decremented by any convenient subtraction means.

Once the counter value is decremented in step 212, the method returns to step 204 and receives the next subsequent picture element from the input matrix. This process is repeated until all of the picture elements in the input matrix have been received and processed to produce a complete output matrix.

One variation of the basic method described above is to offset the counter value and target value by a preselected offset value. This is done by initializing the counter, and/or altering the target value by the preselected offset value by either adding or subtracting the offset value to the values presented above for the basic method. This is referred to as offsetting because it adjusts all of the calculations by the same fixed amount, without changing the increment value added each time a pixel is received from the input matrix. An advantage of the offsetting method is that the target value can be altered to be some convenient number, such as zero, that is easily compared to the counter value. In accordance with the present invention, the counter value will have to be adjusted for the offset value each time the counter surpasses the target value by subtracting or adding the offset value to the counter. This offset variation can be practiced with any of the fractional embodiment or either of the scaled embodiments described hereinbelow.

One feature of this fractional method is that it can be used to expand the data such that the output matrix has a higher number of pixels per unit length than does the input matrix. This is accomplished by modifying the flow shown in FIG.

2 such that after decrementing step 212, control passes to step 208 where the counter value is checked again. Where m>n, the increment value added in step 206 will be greater than one, and the counter value will be two or greater after the increment step 206. So long as the counter value is greater than one in step 208, the incoming pixel is repeatedly passed to the output matrix so that the output matrix may contain several copies of the same pixel from the input matrix. Once the counter value falls below one in step 208, the process returns to step 204 to receive the next incoming picture element.

In summary, the first embodiment method in accordance with the present invention initializes a counter to a value based on the resolution of the input matrix and the resolution of the output matrix. As each pixel is received from the input matrix, the counter is incremented by an increment value calculated from the resolution of the input matrix and the resolution of the output matrix. When the counter value is greater than one, the picture element is passed to the output matrix and the integer one is subtracted from the counter value.

This first embodiment shown in FIG. 2 is called a fractional method in that the usual value of the counter and the increment value are likely to be fractions or decimal values. Although the first embodiment produces excellent results, the processes of incrementing the counter and initializing the counter to fractional values create difficult calculations. The calculations must be carried out by complex hardware because of the great number of bits of information required to process the decimal values. It is more advantageous to scale these fractional values so that the mathematics can be carried out with integers rather than fractions as described in the next two embodiments.

3. Scaling by Input Matrix Resolution

Figure 3:
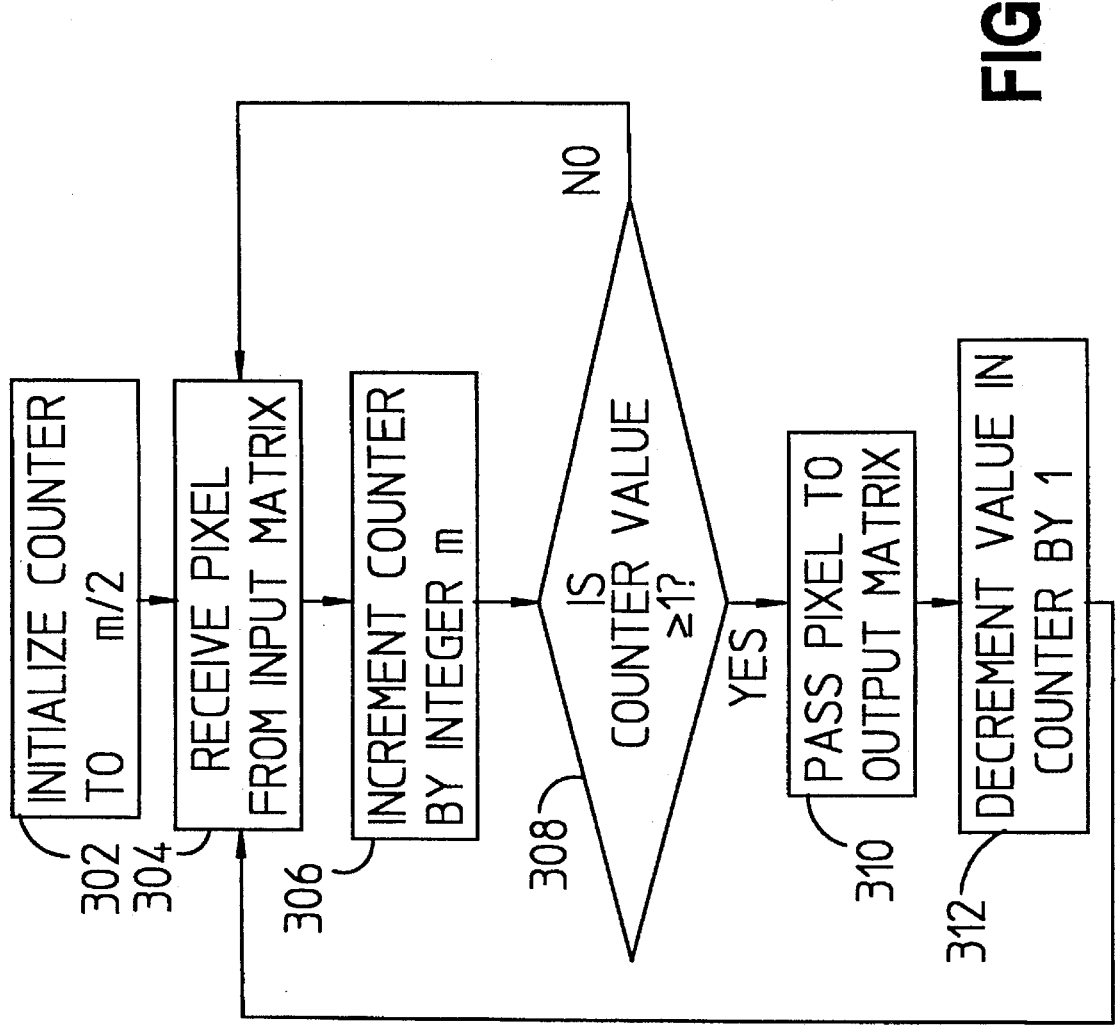
FIG. 3 illustrates a flow chart of a second embodiment method in accordance with the present invention.

The method shown in FIG. 3 scales the calculations by a scaling factor that is substantially equal to the input matrix resolution. By scaling, it is meant that the initial value for the counter, if used, the increment value, and the target value are all multiplied by the scaling factor. The choice of the scaling factor is itself an important feature of the present invention as the proper choice of the scaling factor provides simpler hardware implementation of the method in accordance with the present invention.

In the embodiment shown in FIG. 3, the counter is optionally initialized to one-half the incoming pixel, in step 302. As set out before, the counter initialization step is optional. Step 304 is analogous to step 204 described hereinbefore in which a picture element is received from the input matrix. After the picture element is received, the counter is incremented by the integer m in step 306. The integer value used in this second embodiment is calculated by multiplying the integer value in the embodiment shown in FIG. 2 (i.e., $$\frac{1/n}{1/m},$$

by the value n. This results in an increment value of m. When m, which represents the resolution of the output matrix, is an integer, the step of incrementing in step 306 is greatly simplified because only integer arithmetic is involved.

After the step of incrementing, the counter value is compared to the target value in step 308. Here, the target value is the integer n. The target value is calculated by multiplying the target value shown in FIG. 2 (i.e., the integer one) by the resolution n of the input matrix. This results in a target value of n. Again, where n is selected to be an integer value, the comparison is greatly simplified and easily implemented with common digital devices.

If the counter value is less than n in step 308, control passes again to step 304 and the process is repeated with the next subsequent picture element from the input matrix. When the counter value is greater than n, flow passes to step 310 in which the input pixel is passed to the output matrix.

Next, the value in the counter is decremented by the target value in step 312. Because the target value is an integer n, the decrementing step 312 can be implemented using conventional integer subtraction methods and hardware. After step 312, flow passes again to step 304 to receive the next subsequent pixel. The steps 304, 306, 308, 310, and 312 are repeated until all of the picture elements in the input matrix have been processed and a complete output matrix provided.

The embodiment shown in FIG. 3 offers the advantage that all of the arithmetic is integer arithmetic and so is implemented with simpler hardware than the embodiment shown in FIG. 2. However, this method still requires the use of a comparator to detect when the counter value is greater than n in step 306. Also, this method requires additional hardware to allow the subtraction function in step 310. It is advantageous if the comparator and subtraction hardware can be eliminated so that only an integer addition function needs to be performed by the hardware.

4. Optimal Method—Scaling by a Power of Two

Figure 4:
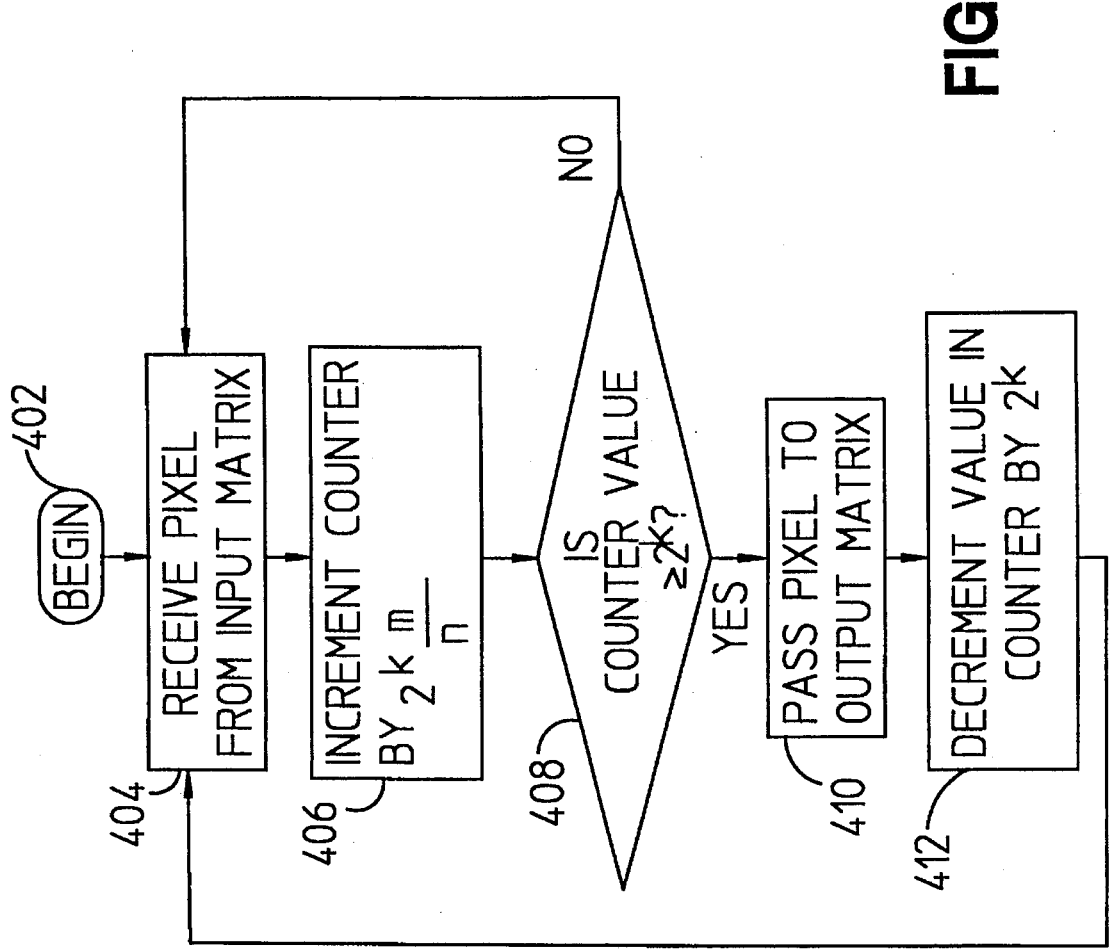
FIG. 4 illustrates a third embodiment pixel selection method in accordance with the present invention.

FIG. 4 illustrates an embodiment of the present invention that is optimal for many applications. In step 402, the process is initialized. In the embodiment shown in FIG. 4, the optional counter initialization has been eliminated. In step 404, the first pixel of the input matrix is received in a manner similar to step 304 of the embodiment shown in FIG. 3 and step 204 of the embodiment shown in FIG. 2.

Next, the counter is incremented by an increment value in step 406. Here, however, the increment value is scaled by a power of two (i.e., $2^k$). This provides an increment value of $2^k$.

$$2^k \left( \frac{m}{n} \right).$$

The exponent k can be any desired integer value, although, as it will be seen, the larger the value of k, the more complex the hardware required to implement the method. Preferably, the increment value is converted or rounded to an integer value to simplify the mathematics. In this case, the larger the value of k, the less error introduced by the process of rounding the increment value to an integer. Suitable results are obtained when k is in the range eight to sixteen, although other values are suitable for particular applications.

In step 408 the value of the counter is compared to the target value, as in the other embodiments. In the embodiment shown in FIG. 4, the counter value is $2^k$. This is found by multiplying the target value, the integer one, by the scaling factor $2^k$ for this embodiment. It should be noted that because the scaling factor was selected to be a power of two, that the target value $2^k$ is handled especially easily by binary logic circuits. This will be apparent in the implementation shown in FIG. 6.

If the counter value is not greater than the target value, the process returns to step 404 and receives the next subsequent pixel from the input matrix. If the counter is greater than the target value, flow passes to step 410 in which the current pixel is passed from the input matrix to the output matrix. Next, the value in the counter is decreased by the target value, in this case $2^k$, in step 412. Again, because the scaling factor causes the target value to be a power of two, the decrement function is very easily handled in binary logic components as shown clearly in FIG. 6.

In summary, the preferred embodiment is substantially the same flow as the first and second embodiments, but uses a scaling factor that is a power of two. The value of the exponent k is an integer that is selected by balancing the need for simple hardware with the need for high precision in the output matrix.

The steps shown in the methods described in FIG. 2, FIG. 3, and FIG. 4 will normally be executed in the order described. However, where appropriate, the process steps may be performed in other orders, or other process steps or subroutines interjected between two adjacent process steps in the figures. These modifications of the present invention are encompassed by the inventive concept disclosed herein.

5. Hardware Implementations

Figure 5:
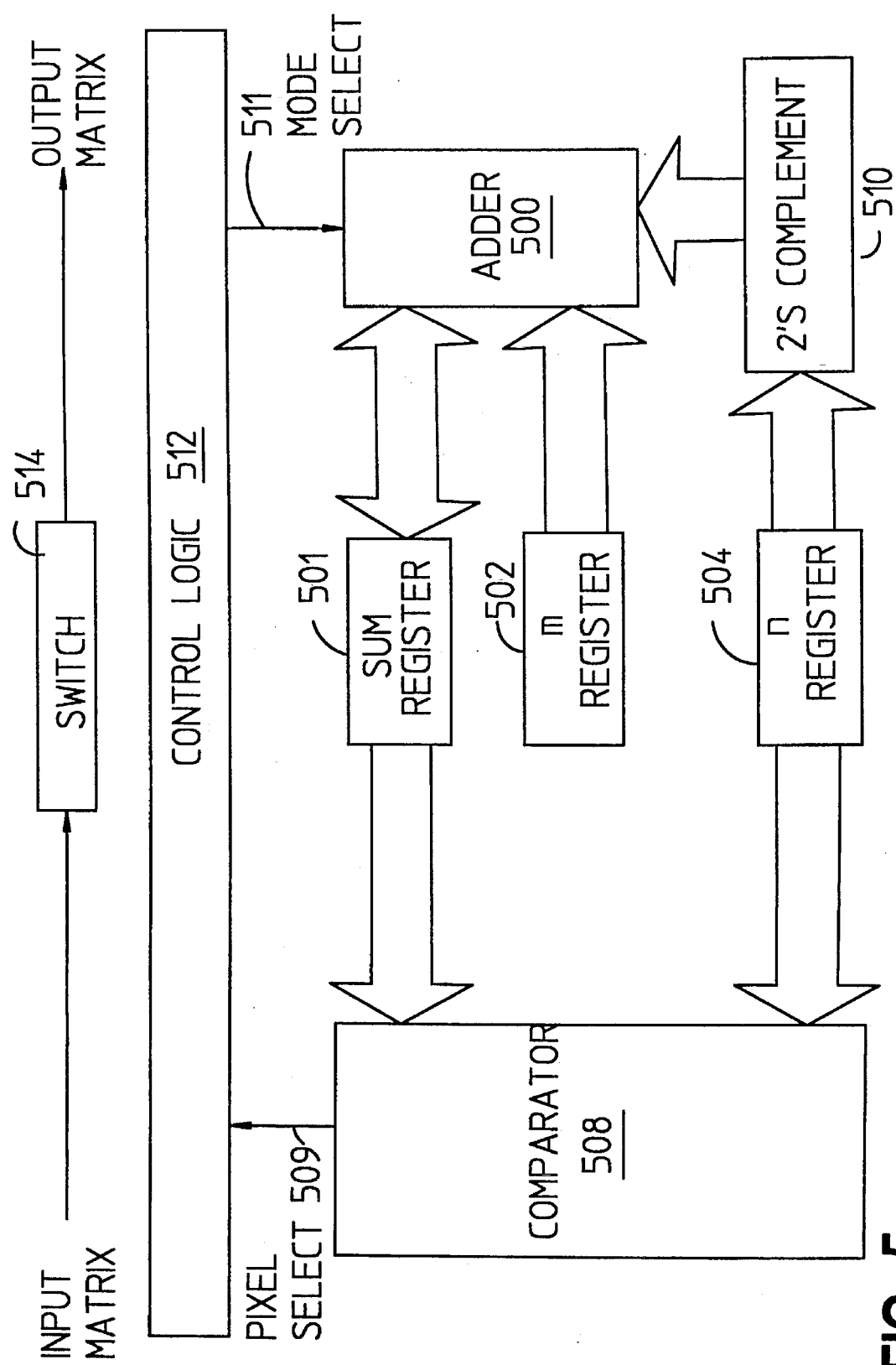
FIG. 5 illustrates in block diagram form a first embodiment image processing apparatus in accordance with the present invention.
Figure 6:
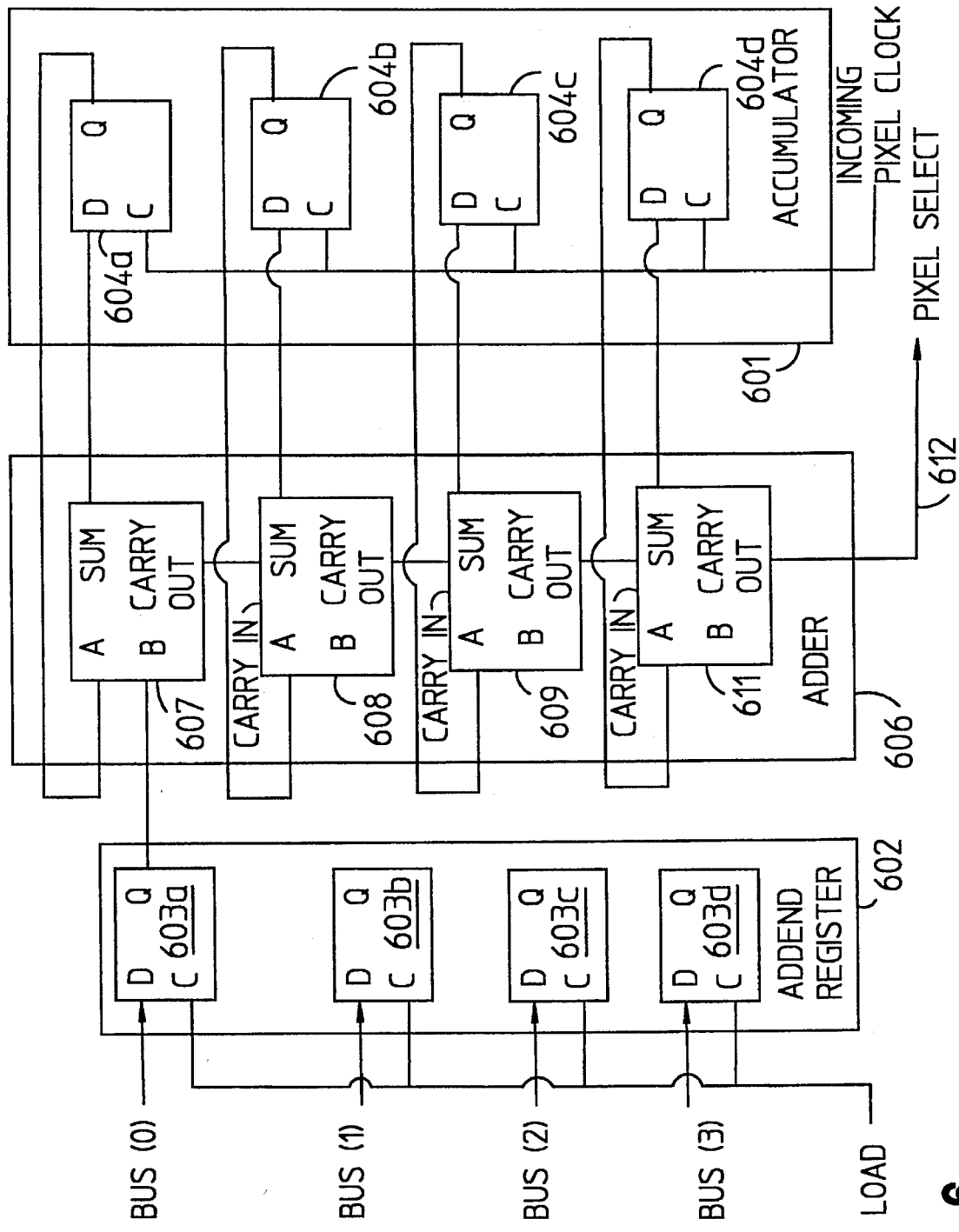
FIG. 6 illustrates in block diagram form a portion of a preferred embodiment pixel selection apparatus in accordance with the present invention.

FIG. 5 and FIG. 6 illustrate portions of hardware implementations of the methods in accordance with the present invention. The hardware implementations shown in FIG. 5 and FIG. 6 are simplified and shown in block diagram form for ease of understanding. FIG. 5 illustrates a general circuit for carrying out the methods of the present invention that is particularly applicable to the embodiments described in connection with FIG. 2 and FIG. 3. FIG. 6 illustrates a portion of a circuit particularly adapted to the method described in reference to FIG. 4.

Sum register 501 serves as the counter in the method embodiments described hereinbefore. Sum register 501 stores the sum output from adder 506 and provides the sum output back to adder 506. The sum output provided by sum register 501 is an addend to adder 506 and thus sum register 501 serves as an accumulator. The m-register 502 serves to hold a value equal to, or proportional to, the resolution of the output matrix. Because this resolution was called m in FIG. 1, register 502 is referred to an m-register.

Register 504 is referred to as an n-register because it holds the value of the resolution of the input matrix shown in FIG. 1. The values held in m-register 502 and n-register 504 may be the integer resolution numbers described in the preferred embodiments, or may be fractional resolution numbers. In the fractional embodiment, n-register 504 holds the target value, or the integer one, and the m-register holds the increment value, or $$\frac{1/n}{1/m}.$$

The m-register 502 is coupled to one of the addend inputs of adder 506. Adder 506 thus serves to add the value in m-register 502 to the value in sum register 501, and store the result into sum register 501 each time it is activated.

Adder 506 as well as the other components are controlled by a clock signal (not shown) that is synchronized with the incoming pixels from the input matrix. Each incoming picture element in the input matrix generates a clock pulse causing adder 506 to add the value m to sum register 501 and store the result of that addition back into sum register 501.

Sum register 501 and n-register 504 are coupled to comparator 508. Comparator 508 produces an output on pixel select line 509 whenever the content of sum register 501 is greater than the content of n-register 504. The output on line 509 is referred to as a pixel select output, because it indicates when a picture element in the input matrix should be passed to a picture element in the output matrix.

Pixel select line 509 is coupled to control logic 512 which comprises conventional state-machine type logic. Control logic 512 uses the control signal on pixel select line 509 to send a control signal to switch 514 causing the current input pixel to be passed to the output matrix. Control logic 512 also generates a select signal on mode select line 511 that is applied to adder 506. The select signal causes adder 506 to change from an add mode to a subtract mode.

The subtract mode is implemented in the preferred embodiment by coupling the n-register 504 to a 2's-complement block 510. The 2's-complement block 510 converts the value of the n-register to a 2's-complement form using well-known circuitry. The 2's-complement form is selectively applied to an addend input to adder 506. Adder 506 selects the m-register in a first mode and selects the input from the 2's-complement block 510 in a second mode. The particular mode in which adder 506 operates is determined by the mode select signal on line 511 provided by control logic 512.

When the 2's complement block addend is selected, control logic 512 generates an additional clock pulse to adder 506 which serves to subtract the value of the n-register from sum register 501. This results in decrementing sum register 501 by the value stored in n-register 504. Because n-register 504 holds the contents of the target value, this process serves to implement the decrement functions 212 and 312 described in reference to FIG. 2 and FIG. 3.

To ease understanding, several conventional circuit components are not illustrated in FIG. 5. For example, clock signals are supplied by external circuitry, or by circuitry within control logic 512 to adder 506, comparitor 508 2's complement circuit 510 and other circuitry that requires clock synchronization. Also, sum register 501, m-register 502, and n-register 504 are loaded with initial values via a data bus or similar date transfer structure (not shown) as is conventionally done in digital logic circuits.

The hardware implementation shown in FIG. 5 uses conventionally available circuitry and eliminates much of the hardware required by prior art methods. For example, no binary rate multiplier is required nor are complex processors required to perform two-dimensional convolution. This greatly simplifies the hardware thereby decreasing cost and increasing processing speed.

A second embodiment hardware implementation is shown in FIG. 6. The hardware implementation in FIG. 6 is particularly adapted to implement the method described in reference to FIG. 4. The simplified hardware implementation involves an addend register 602 that is roughly analogous to the m-register 502 shown in FIG. 5, an adder 606 that is analogous to the adder 506 shown in FIG. 5, and an accumulator 601 that is analogous to sum register 501 shown in FIG. 5.

The apparatus shown in FIG. 6 is useful for practicing the method of scaling by a factor of two. The integer exponent k in the scaling factor $2^k$ is determined by the number of bits that can be stored and processed by addend register 602, adder 606, and accumulator 601. In the particular example illustrated in FIG. 6, addend register 602 is four bits wide, adder 606 is a four-bit full adder, and accumulator 601 is four bits wide so that k=4 and the scaling factor equals $2^4$ or 16.

Thee input lines labeled bus (0), bus (1), bus (2), and bus (3) are provided by an external circuit (not shown) and contain the binary equivalent of the scaling factor $2^k$.

$$2^k \left( \frac{m}{n} \right).$$

The value stored in addend register 602 is the scaled increment value described in the methods presented earlier. It should be noted that because the integer m is always smaller than the integer n, the scaled increment value will always be less than $2^k$ and so will always fit into an addend register having k bits. It should also be noted that an inherent feature of the implementation shown in FIG. 6 is that the value stored in addend register 602 is rounded or truncated to an integer value, as no provision is made to store the decimal portion of the value $2^k$.

$$2^{\left(\frac{m}{n}\right)}.$$

Some error is introduced by the rounding or truncating process, but so long as k is large (i.e., greater than eight) this error is small.

Addend register 602 comprises k D-type flip-flops 603a, 603b, 603c, and 603d having the D input coupled to receive the scaled increment value from bus lines bus(O) through bus(3). A load signal is coupled to each of the C inputs to the D-type flip-flops 603a through 603d to load the scaled increment value at the beginning of the process. Each Q output of one of the D-type flip-flops in the addend register 602 is coupled to one of the addend inputs to adder 606.

Adder 606 is configured as a k-bit full adder. Adder cell 607 is the least significant bit while adder cell 611 is the most significant bit as configured in FIG. 6. Adder 606 comprises k cells, a number of which are least significant bits, and only one of which will be a most significant bit, such as cell 611. Each adder cell has two inputs, labeled A and B in FIG. 6, that are the addend inputs. Each cell 607 through 611 has a carry out, a sum out, and a carry in as is conventional for full binary adder circuits.

Each carry input for the least significant bit adder cells 608, 609, and 611 is coupled to receive the carry output from the next least significant bit cell. In other words, the carry in for cell 611 receives the carry out from cell 609 and the carry in for cell 609 receives the carry out for cell 608. The least significant bit cell 607 does not receive a carry input.

Accumulator 601 comprises k D-type flip-flops 604a, 604b, 604c, and 604d having the D input coupled to receive the sum outputs from corresponding cells in adder 606. The incoming pixel clock signal is coupled to each of the C inputs to update the contents of accumulator 601 each time a pixel is received from the input matrix. Each Q output of the D-type flip-flops in the accumulator register 601 is coupled to one of the addend inputs of adder 606.

An important feature of the present invention is that the carry output from the most significant bit cell 611 is used to provide a pixel select signal on line 612. The carry output signal is generated on line 612 whenever the value in accumulator 601 when added to the value in addend register 602 is greater than binary 1111. This occurs when the value in the accumulator is binary 10000 (i.e., $2^4$) or greater. It will be recalled that in the method described in reference to FIG. 4, the target value is $2^k$. Thus, the circuit of FIG. 6 serves to automatically subtract $2^k$ from the value in the accumulator because the accumulator is only k bits wide and it would require k+1 bits to account for a carry out signal on line 612.

Because the target value is $2^k$ the pixel select line 612 automatically goes high when the accumulator value is greater than the target value, indicating when a pixel should be passed from the input matrix to the output matrix as described in reference to FIG. 4. Pixel select 612 is coupled to any convenient switch, such as switch 514 shown in FIG. 5, that would allow a pixel from the input matrix to be passed to the output matrix.

Pixel select line 612 automatically goes low on the next incoming pixel clock signal unless the value stored in accumulator 601 added to the value stored in addend register 602 is once again greater than $2^k$.

In this manner, the circuitry of FIG. 6 automatically performs the functions shown in reference to FIG. 4 without requiring a 2's-complement block, an n-register, or a comparator, and uses greatly simplified control logic. Also, because the adder 606 does not have to change between an add mode and a subtract mode, data processing is remarkably quick and data through-put very high.

In summary, the preferred hardware configuration in accordance with the present invention uses a k-bit addend register to store a scaled increment value that is calculated and stored one time before operation. The preferred hardware configuration uses a k-bit register as an accumulator and a k-bit cell full adder. The accumulator receives a clock signal each time a new pixel is received from the input matrix. The carry output of the adder cell for the most significant bit is used to provide a pixel select signal indicating when a pixel should be transferred from the input matrix to the output matrix. Although described in terms of a k-bit registers using D-type flip-flops, other register configurations are known and are equally applicable to the present invention. Also, the present invention is described in terms of a k-bit full binary adder, but other adding circuits are known and their substitution will be apparent to those of skill in the art. Accordingly, these modifications are encompassed by the spirit of the present invention.

It should be appreciated that an image processing method and apparatus are provided that eliminate complex calculations, greatly simplifies hardware, and operates quickly and accurately to provide an output matrix having a resolution less than that of an input matrix. It is to be expressly understood that the claimed invention is not to be limited to the description of the preferred embodiment but encompasses other modifications and alterations within the scope and spirit of the inventive concept.

We claim:

1. An image processing method for converting an input picture element matrix having a first resolution into an output picture element matrix having a second resolution, the method comprising the computer implemented steps of:

determining a first number of picture elements per length for the input picture element matrix;

determining a second number of picture elements per length for the output picture element matrix;

calculating an increment value;

calculating a target value;

sequentially receiving each picture element of the input picture element matrix;

for each of the first number of received picture elements, adding the increment value to the value of a counter; and when the value of the counter is substantially equal to or greater than the target value,
  i) placing the received picture element into the output picture element matrix, and
  ii) subtracting the target value from the value of the counter.

2. The image processing method of claim 1 wherein the first number is n, the second number is m, and the method further comprises a step of setting a counter to an initial value substantially equal to $$\frac{1/n}{2/m}$$

before the step of adding the increment value.

3. The image processing method of claim 2 wherein the increment value is $$\frac{1/n}{1/m}.$$

4. The image processing method of claim 3 wherein the target value is one.

5. The image processing method of claim 1 wherein the first and second numbers are integers, and the increment value is substantially equal to the second number.

6. The image processing method of claim 5 wherein the target value is substantially equal to the first number.

7. The image processing method of claim 1 further comprising a step of subtracting further comprises:

calculating the 2's-complement of the first number; and adding the 2's-complement of the first number to the value of the counter.

8. The image processing method of claim 1 wherein the first number is n, the second number is m, and the increment value is substantially equal to $$2^k \left( \frac{m}{n} \right)$$

where k is an integer.

9. The image processing method of claim 8 wherein the step of calculating the increment value comprises rounding to provide an integer increment value.

10. The image processing method of claim 9 wherein the counter is a binary counter and the step of adding the increment value comprises:

expressing the increment value as a binary number; and using a k-bit full binary adder to add the increment value to the counter value.

11. The image processing method of claim 10 wherein the k-bit full binary adder comprises one most significant bit cell, a plurality of least significant bit cells, each of the cells having a carry bit associated therewith, the method further comprising the steps of:

performing the subtracting step by using only the carry bits of the least significant bit cells of the k-bit full binary adder to perform the adding step; and using the carry bit of the most significant bit cell of the k-bit full binary adder as a control signal indicating when the received picture element should be passed to the output matrix.

12. An image processing method for converting an input picture element matrix having a first resolution into an output picture element matrix having a second resolution, the method comprising the computer implemented steps of:

determining a first number of picture elements per length for the input picture element matrix;

determining a second number of picture elements per length for the output picture element matrix;

initializing a counter;

calculating an increment value based upon the first and second numbers;

calculating a target value based upon the first and second numbers;

multiplying the increment value by a scaling factor to provide a scaled increment value;

multiplying the target value by the scaling factor to provide a scaled target value;

sequentially receiving each picture element of the input picture element matrix and for each received picture element, repeating the steps of:

1) adding the scaled increment value to the value of the counter;

2) decrementing the counter value by the scaled target value when the counter value is greater than or equal to the scaled target value;

3) placing the received picture element into the output picture element matrix when the counter value is greater than or equal to the scaled target value.

13. The image processing method of claim 12 wherein the increment value is substantially equal to the second number divided by the first number.

14. The image processing method of claim 13 wherein the target value is one.

15. The image processing method of claim 14 wherein the first number and the second number are integers, and the scaling factor is substantially equal to the first number.

16. The image processing method of claim 14 wherein the scaling factor is substantially equal to $2^k$ where k is an integer.

17. The image processing method of claim 12 further comprising a step of rounding to provide an integer scaled increment value.

18. An image processing system for converting an input matrix having a first number of picture elements per unit length into an output matrix having a second number of picture elements per unit length, the system comprising:

a first register for holding the first number;

a second register for holding the second number;

a third register for holding a sum value;

an adder having a first input, a second input for receiving the value of the second register, a third input for receiving the value of the third register, the adder having a first mode in which it adds the values from the second and third inputs, and stores the result in the third register, and having a second mode in which it adds the values from the first and third inputs, and stores the result in the third register;

means having an input coupled to the first register and an output coupled to the first input of the adder for converting the value stored in the first register to 2's-complement form and providing the converted value to the third input of the adder;

means for generating a binary output signal when the value stored in the third register is greater than or equal to the value stored in the first register;

a switch having a data input, a data output, and a control input for selectively coupling the data input to the data output in response to a control signal on the control input; and a control circuit coupled to receive the binary output signal and providing the control signal to the control input of the switch and a mode select signal to the adder.

19. An image processing system for converting an input matrix having a first number of picture elements per unit length into an output matrix having a second number of picture elements per unit length, the system comprising:

means for individually receiving each picture element in the input matrix;

means for selectively passing the individual received picture element from the input matrix to the output matrix in response to a control signal;

a first register for storing a first number;

adding means for adding the first number to a second number each time an individual picture element is received, the means for adding providing a sum output means included within the adding means for generating the control signal to the means for selectively passing in response to the sum output exceeding a target value;

accumulating means for storing the sum output of the means for adding, and providing the second number to the means for adding, wherein the second number is equal to the stored sum output; and means coupled to receive the control signal from the adding means for decrementing the sum output stored in the accumulating means by the target value in response to the control signal.

20. The image processing apparatus of claim 19 wherein the first number is n, the second number is m, and the first register comprises a first k-bit binary register for storing a value substantially equal to $$2^k \left( \frac{m}{n} \right).$$

21. The image processing apparatus of claim 20 wherein the means for adding comprises a k-bit full binary adder including a plurality of least significant bit cells and one most significant bit cell, a carry output of the most significant bit cell providing the control signal to the means for selectively passing.

22. The image processing apparatus of claim 21, each cell of the k-bit full binary adder further comprising:

a A input;

a B input coupled to a corresponding bit of the first k-bit register;

a carry output;

a carry input coupled to receive the carry output of the next least significant bit cell; and a sum output coupled to the accumulating means.

23. The image processing apparatus of claim 22 wherein the accumulating means comprises a second k-bit register for storing a value from each sum output of the k-bit full binary adder each time a picture element from the input matrix is received, where each bit of the second k-bit register is provided to an A input of a corresponding cell of the k-bit full binary adder.

24. An image processing method for converting an input picture element matrix having a first resolution into an output picture element matrix having a second resolution, the method comprising the computer implemented steps of:

determining a first number of picture elements per length for the input picture element matrix;

determining a second number of picture elements per length for the output picture element matrix;

calculating an increment value;

calculating a target value;

determining an offset value;

adjusting the target value by the offset value;

sequentially receiving each picture element of the input picture element matrix;

for each of the first number of received picture elements, adding the increment value to the value of a counter; and when the value of the counter is substantially equal to or greater than the adjusted target value,
  i) placing the received picture element into the output picture element matrix,
  ii) if the target value is not zero, subtracting the target value from the value of the counter, and
  iii) subtracting the offset value from the value of the counter.

\* \* \* \* \*